(12) United States Patent
Halbleib et al.

(10) Patent No.: US 9,758,916 B2
(45) Date of Patent: Sep. 12, 2017

(54) APPLIANCE AND METHOD FOR REMOVING NOISE FROM A MOTOR CHARACTERISTIC SIGNAL IN A LAUNDRY TREATING APPLIANCE

(71) Applicant: Whirlpool Corporation, Benton Harbor, MI (US)

(72) Inventors: Alexander J. Halbleib, Saint Joseph, MI (US); Michael J. Hand, III, Ann Arbor, MI (US); Brian P. Janke, Saint Joseph, MI (US); Joseph M. Keres, Plano, IL (US); Stephen L. Keres, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 505 days.

(21) Appl. No.: 14/296,520

(22) Filed: Jun. 5, 2014

(65) Prior Publication Data

US 2015/0354124 A1  Dec. 10, 2015

(51) Int. Cl.
| | |
|---|---|
| *D06F 37/30* | (2006.01) |
| *D06F 37/24* | (2006.01) |
| *H02P 23/00* | (2016.01) |
| *D06F 37/20* | (2006.01) |
| *D06F 33/02* | (2006.01) |

(52) U.S. Cl.
CPC .......... *D06F 37/304* (2013.01); *D06F 37/203* (2013.01); *D06F 37/24* (2013.01); *H02P 23/0077* (2013.01); *D06F 33/02* (2013.01); *D06F 2202/12* (2013.01); *D06F 2204/065* (2013.01); *D06F 2222/00* (2013.01)

(58) Field of Classification Search
None
See application file for complete search history.

(56) References Cited

U.S. PATENT DOCUMENTS

| | | | |
|---|---|---|---|
| 2008/0134727 A1* | 6/2008 | May | G01D 5/145 68/12.02 |
| 2012/0278996 A1* | 11/2012 | Park | D06F 33/02 8/137 |
| 2013/0340485 A1* | 12/2013 | Zeh | D06F 37/203 68/23.1 |

* cited by examiner

*Primary Examiner* — Michael Barr
*Assistant Examiner* — Rita Adhlakha

(57) ABSTRACT

An apparatus and method of sensing a motor characteristic signal in a laundry treating appliance having a drum rotated by a motor about a rotational axis, sampling the motor characteristic signal, filtering the motor characteristic signal, and evaluating the filtered motor characteristic signal for the presence of a predetermined condition corresponding to the motor characteristic signal.

6 Claims, 7 Drawing Sheets

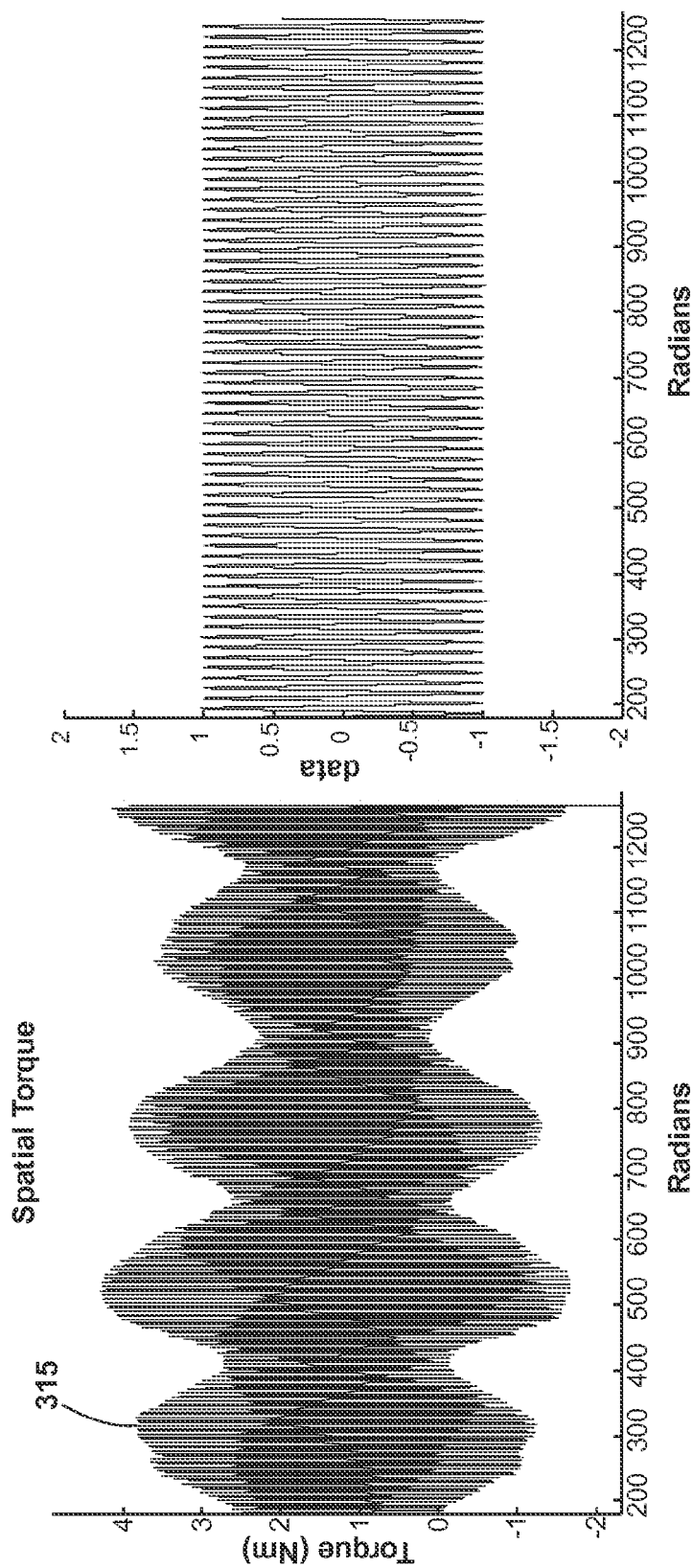

APPLIANCE AND METHOD FOR REMOVING NOISE FROM A MOTOR CHARACTERISTIC SIGNAL IN A LAUNDRY TREATING APPLIANCE

BACKGROUND OF THE INVENTION

Laundry treating appliances, such as clothes washers, may include a perforate rotatable drum or basket positioned within an imperforate tub to be rotated by a motor. The drum may at least partially define a treating chamber in which a laundry load may be received for treatment according to a selected cycle of operation. During at least one phase of a selected cycle, the motor operably spins the drum and laundry load about a rotational axis at a predetermined high speed, sufficient to centrifugally move and hold laundry load items against the perimeter of the treating chamber, causing liquid to be removed from the laundry load. The speed at which the clothes cease to move with respect to the drum but are held in contact with it may be referred to as the "satellization" speed.

BRIEF SUMMARY OF THE INVENTION

In one aspect, a method of removing noise from a motor characteristic signal in a laundry treating appliance having a drum rotated by a motor about a rotational axis includes generating the motor characteristic signal by spatial sampling of the motor characteristic on a per revolution basis during the rotation of the drum about the rotational axis, filtering from the motor characteristic signal a noise signal within the range of variability of the motor characteristic to form a filtered motor characteristic signal, and evaluating the filtered motor characteristic signal for the presence of a predetermined condition corresponding to the motor characteristic signal.

In another aspect, a laundry treating appliance for treating laundry according to an automatic cycle of operation includes a rotatable drum at least partially defining a treating chamber for receiving laundry for treatment according to the automatic cycle of operation, a motor operably coupled to and rotationally driving the rotatable drum, a sensor providing output corresponding to a motor characteristic at predetermined rotational positions for the motor to form spatial output, and a controller operably coupled to the motor and the sensor. The controller executes the cycle of operation by receiving the sensor output to generate a motor characteristic signal based on the spatial output, applies a filter to the motor characteristic signal to remove a noise signal within the range of variability of the motor characteristic to form a filtered motor characteristic signal, and evaluates the filtered motor characteristic signal for the presence of a predetermined condition corresponding to the motor characteristic signal.

BRIEF DESCRIPTION OF THE SEVERAL VIEWS OF THE DRAWINGS

In the drawings:

FIGS. 7A & 7B illustrate the relationship between motor torque signal as a function of spatial sampling, and a resultant filtering of the motor torque signal as a function of spatial sampling.

DESCRIPTION OF AN EMBODIMENT OF THE INVENTION

Figure 1:
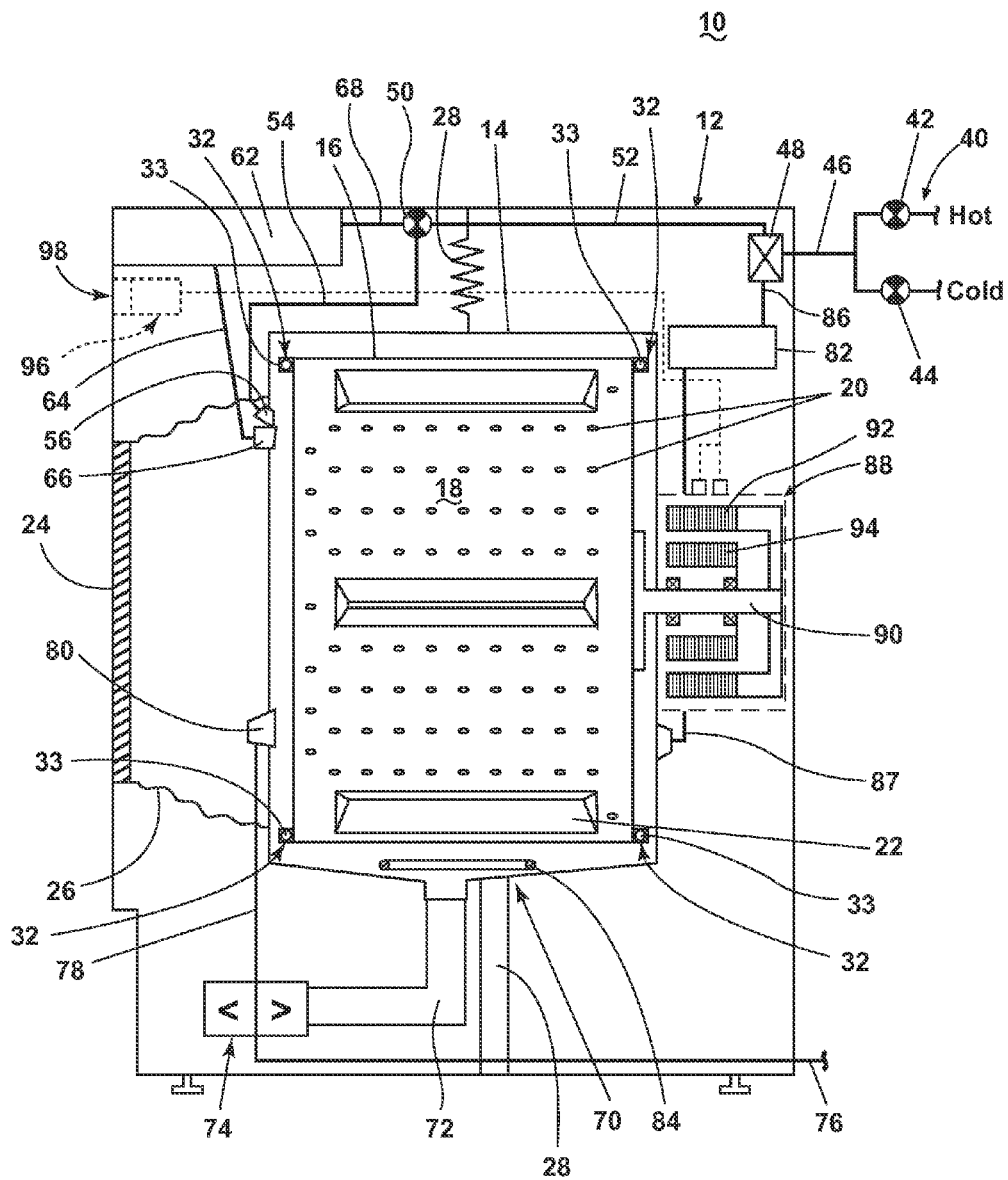
FIG. 1 is a schematic view of a laundry treating appliance in the form of a washing machine according to a first embodiment of the invention.

Referring now to the drawings, FIG. 1 is a schematic view of a laundry treating appliance according to an embodiment of the invention. The laundry treating appliance may be any appliance that performs an automatic or manual cycle of operation to clean or otherwise treat items placed therein, non-limiting examples of which include a horizontal or vertical axis clothes washer; a combination washing machine and dryer; a dispensing dryer; a tumbling or stationary refreshing/revitalizing machine; an extractor; a non-aqueous washing apparatus; and a revitalizing machine.

The laundry treating appliance of FIG. 1 is illustrated as a washing machine 10, which may include a structural support system comprising a cabinet 12 that defines a housing within which a laundry holding system resides. The cabinet 12 may be a housing having a chassis and/or a frame, defining an interior that encloses components typically found in a known washing machine, such as motors, pumps, fluid lines, controls, sensors, transducers, and the like. Such components will not be described further herein except as necessary for a complete understanding of the invention.

The laundry holding system may comprise a tub 14 supported within the cabinet 12 by a suitable suspension system 28 for dynamically suspending the laundry holding system within the structural support system, and a rotatable drum 16 provided within the tub 14 and defining at least a portion of a laundry treating chamber 18. The drum 16 may include a plurality of perforations 20 such that liquid may flow between the tub 14 and the drum 16 through the perforations 20. A plurality of baffles 22 may be disposed on an inner surface of the drum 16 to facilitate lifting of laundry items in the treating chamber 18 as the drum 16 rotates. It is also within the scope of the invention for the laundry holding system to comprise only a tub, with the tub defining the laundry treating chamber.

The laundry holding system may further include a door 24 that may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14.

The washing machine 10 may also include at least one balancing ring 32 containing a balancing material 33 moveable within the balancing ring 32 to counterbalance an imbalance that may be caused by laundry in the treating chamber 18 during rotation of the drum 16. The balancing material 33 may be in the form of metal balls, fluid or a combination thereof. The balancing ring 32 may extend circumferentially around a periphery of the drum 16 and may be located at any desired location along an axis of rotation of the drum 16. When multiple balancing rings 32 are present, they may be equally spaced along the axis of rotation of the drum 16.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively.

The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 that may direct the flow of liquid to a supply conduit 52. The second diverter mechanism 50 on the supply conduit 52 may direct the flow of liquid to a tub outlet conduit 54 that may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a dispenser 62 that may be a single use dispenser, a bulk dispenser or a combination of a single use and bulk dispenser.

Regardless of the type of dispenser used, the dispenser 62 may be configured to dispense a treating chemistry directly to the tub 14 or mixed with water from the liquid supply system through a dispensing outlet conduit 64. The dispensing outlet conduit 64 may include a dispensing nozzle 66 configured to dispense the treating chemistry into the tub 14 in a selected pattern and under a selected pressure. For example, the dispensing nozzle 66 may be configured to dispense a flow or stream of treating chemistry into the tub 14 by gravity, i.e. a non-pressurized stream. Water may be supplied to the dispenser 62 from the supply conduit 52 by directing the diverter mechanism 50 to direct the flow of water to a dispensing supply conduit 68.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 may also include a recirculation and drain system for recirculating liquid within the laundry holding system and draining liquid from the washing machine 10. Liquid supplied to the tub 14 through tub outlet conduit 54 and/or the dispensing supply conduit 68 may enter a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry, may be recirculated into the treating chamber 18 for treating the laundry within.

The liquid supply and/or recirculation and drain system may be provided with a heating system that may include one or more devices for heating laundry and/or liquid supplied to the tub 14, such as a steam generator 82 and/or a sump heater 84. The steam generator 82 may be any suitable steam generator, such as a flow-through steam generator or a tank-type steam generator. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. Alternatively, the sump heater 84 may be used to generate steam in place of or in addition to the steam generator 82. In addition to or instead of generating steam, the steam generator 82 and/or sump heater 84 may be used to heat the laundry and/or liquid within the tub 14 as part of a cycle of operation.

The liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 may also include a drive system for rotating the drum 16 within the tub 14. The drive system may include a motor 88, which may be directly coupled with the drum 16 through a drive shaft 90 to rotate the drum 16 about a rotational axis during a cycle of operation. The motor 88 may be a brushless permanent magnet (BPM) motor having a stator 92 and a rotor 94. Alternately, the motor 88 may be coupled to the drum 16 through a belt and a drive shaft to rotate the drum 16, as is known in the art. Other motors, such as an induction motor or a permanent split capacitor (PSC) motor, may also be used. The motor 88 may rotate the drum 16 at selected speeds in either rotational direction.

The washing machine 10 may also include a control system for controlling the operation of the washing machine 10 to implement one or more cycles of operation. The control system may include a controller 96 located within the cabinet 12 and a user interface 98 that may be operably coupled with the controller 96. The user interface 98 may include one or more knobs, dials, switches, displays, touch screens and the like for communicating with a user, such as receiving input and providing output. The user may enter different types of information including, without limitation, cycle selection and cycle parameters, such as cycle options.

The controller 96 may include a machine controller and any additional controllers for controlling any of the components of the washing machine 10. For example, the controller 96 may include the machine controller and a motor controller. Many known types of controllers may be used for the controller 96. The specific type of controller is not germane to the invention. It is contemplated that the controller may be a microprocessor-based controller that implements control software and sends/receives one or more electrical signals to/from each of the various working components to affect the control software. As an example, proportional control (P), proportional integral control (PI), and proportional derivative control (PD), or a combination thereof, a proportional integral derivative control (PID control), may be used to control the various components.

Figure 2:
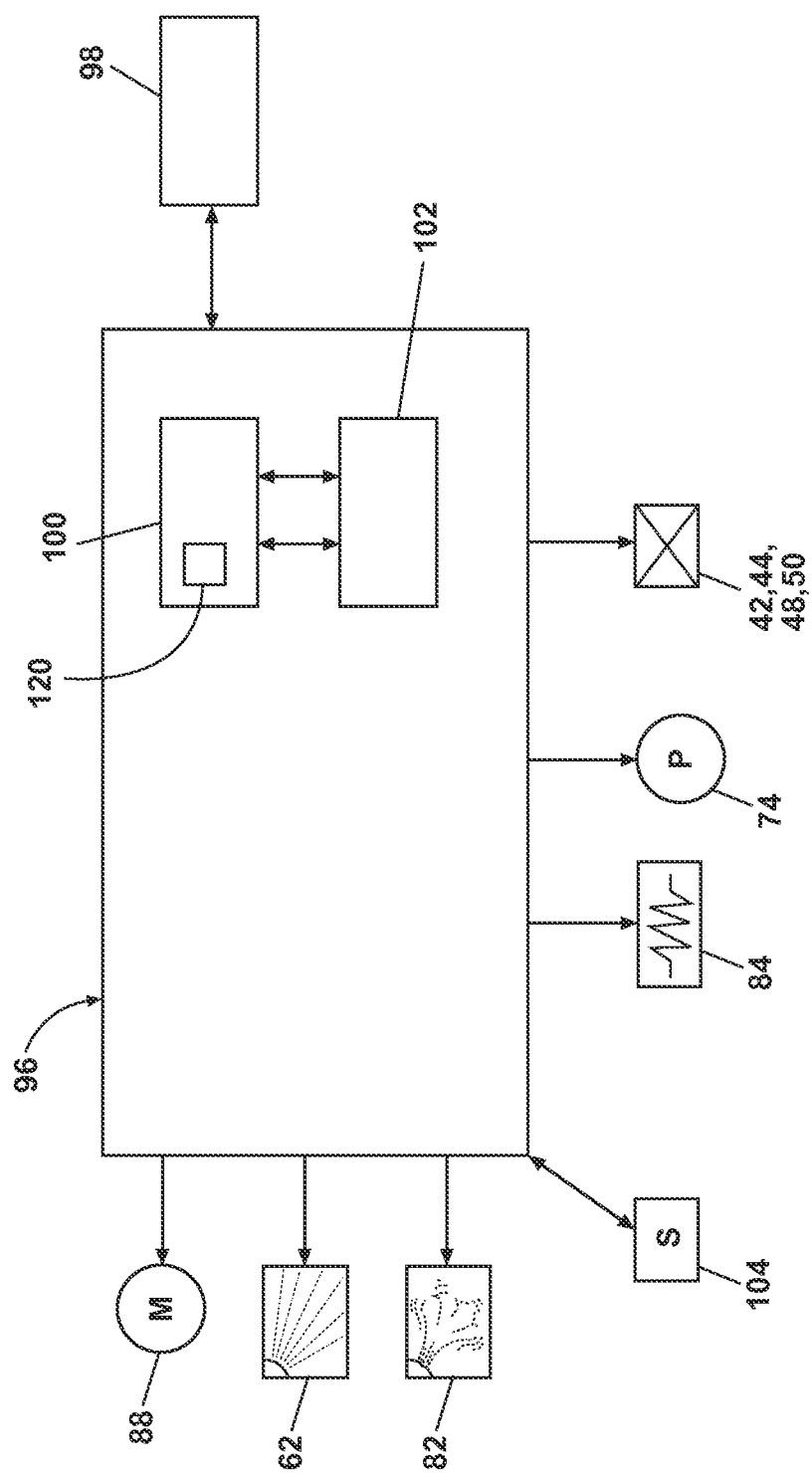
FIG. 2 is a schematic of a control system of the laundry treating appliance of FIG. 1 according to the first embodiment of the invention.

As illustrated in FIG. 2, the controller 96 may be provided with a memory 100 and a central processing unit (CPU) 102. The memory 100 may be used for storing the control software that is executed by the CPU 102 in completing a cycle of operation using the washing machine 10 and any additional software. Examples, without limitation, of cycles of operation may include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input. For example, a table 120 may include a table of a plurality of spin speed ranges.

The controller 96 may be operably coupled with one or more components of the washing machine 10 for communicating with and controlling the operation of the component to complete a cycle of operation. For example, the controller 96 may be operably coupled with the motor 88, the pump 74, the dispenser 62, the steam generator 82, and the sump heater 84, to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor, and/or an imbalance sensor. The controller 96 may also be communicably coupled with one or more motor characteristic sensors 104 capable of generating signals indicative of motor characteristic. These motor characteristic sensors 104 generating motor characteristic signals may include, for example, a motor torque sensor, a motor power sensor, and/or a motor speed sensor, each of which may be used to determine a variety of system and laundry characteristics, such as laundry load inertia or mass. For example, the motor torque sensor may sense or measure the torque characteristics generated by the motor 88 in rotating the drum 16 and generate a motor torque signal reflective of that sensing or measuring. While the motor characteristic sensors 104 are described as "sensing" and/or "measuring" the respective characteristics of the motor 88, it is envisioned that sensing and/or measuring may include the determination of a value indicative or related to the motor characteristics, and not the actual values. For example, it is common for such sensors to output a voltage signal that is proportional to, for example, the motor torque. Thus, the magnitude of the voltage signal is indicative of the torque. In another example, "sensing" and/or "measuring" may include the estimation of a value indicative or related to the motor characteristics, and not the actual values. For example, motor phase currents and voltages may be used indicate or to estimate a characteristic of the motor 88. Additional motor characteristic sensors 104 may be included.

As another example of a motor characteristic sensor 104, a speed sensor, may also be included in the washing machine 10 and may be positioned in any suitable location for detecting and indicating a speed output indicative of a rotational speed of the drum 16. Such a speed sensor may be any suitable speed sensor capable of providing an output indicative of the speed of the drum 16. The rotational speed of the drum 16 may also be determined based on motor speed; thus, a speed sensor may include a motor speed sensor for determining a speed output indicative of the rotational speed of the motor 88. The motor speed sensor may be a separate component, or may be integrated directly into the motor 88. Regardless of the type of speed sensor employed, or the manner of coupling the drum 16 with the motor 88, the speed sensor may be adapted to enable the controller 96 to determine the rotational speed of the drum 16 from the rotational speed of the motor 88.

Conventionally, rotation of the drum may be characterized in terms of either rotational speed or frequency. As an example, 1 rotation per second (speed) may be equivalent to 1 Hz or 1 cycle per second (frequency). Thus, speed and frequency may be interchangeable.

Depending upon the rotational speed of the drum 16, the laundry load may undergo at least one of tumbling, rolling (also called balling), sliding, satellizing (also called plastering), and combinations thereof. Tumbling, rolling, sliding, and satellizing are terms of art that may be used to describe the motion of some or all of the items forming the laundry load. For example, during tumbling, fabric items may be carried from a lowest location in the drum 16 towards a highest location in the drum 16, but may fall back to the lowest location before reaching the highest location. During satellizing, the drum 16 may rotate at a speed such that fabric items are held against the inner surface of the drum 16 and rotate with the drum 16 without falling.

Figure 3:
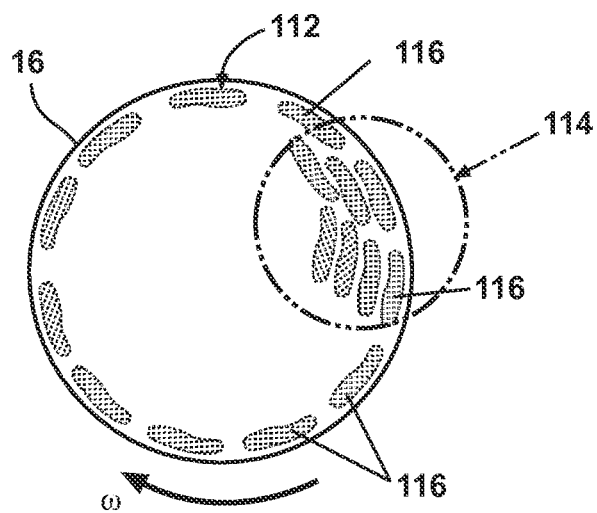
FIG. 3 illustrates a laundry load, including an imbalance, in a drum of the laundry treating appliance of FIG. 1, during a spin phase of a cycle of operation.

During a cycle of operation, a laundry load may become unevenly distributed about the treating chamber 18. Referring to FIG. 3, an unequally distributed laundry load 112 is shown in the drum 16 that is rotated at a spin speed, $\omega$, sufficient to satellize the laundry load 112. However, not all satellized laundry items 116 may be located an equal distance from the axis of drum rotation, which may lead to an imbalance 114 due to the uneven distribution of the laundry items 116. During rotation of the drum 16, the imbalance 114 may be characterized as a sinusoidal motor torque signal having a frequency equivalent to the drum rotational speed, $\omega$.

Figure 4:
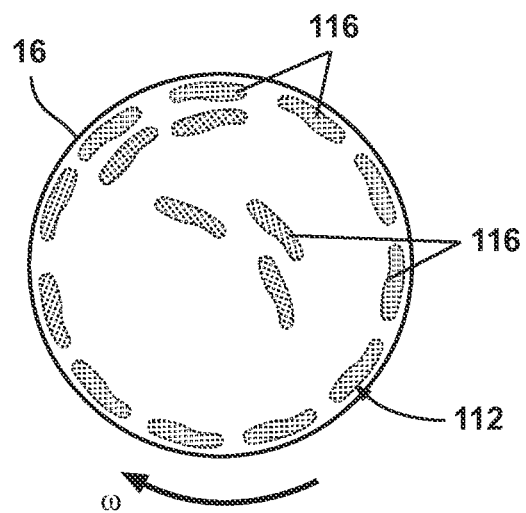
FIG. 4 illustrates the laundry load in the drum of the laundry treating appliance of FIG. 1, a portion of which is tumbling during the cycle of operation.

FIG. 4 illustrates the laundry load 112 during rotation of the drum 16 at a speed, $\omega$, which is lower than the speed at which the entire load 112 may be satellized. At this lower rotational speed, some laundry item 116, such as items contributing to the imbalance 114, may tumble. The tumbling items 116 may affect the motor torque signal, which may be characterized as a high-frequency component superimposed on the lower frequency sinusoidal signal.

The controller 96 may be programmed to maintain a selected drum speed, $\omega$, by controlling the electric power to the motor 88. When an imbalance 114 exists within the drum 16, cyclical variations in the motor torque signal may reflect cyclical variations in required motor torque and power. Specifically, when the imbalance 114 may move in an upward direction with rotation of the drum 16, a relatively high level of torque may be developed by the motor 88 to maintain a selected rotational speed, $\omega$. Conversely, when the imbalance 114 may move in a downward direction with rotation of the drum 16, a relatively low level of torque may be developed by the motor 88 to maintain the selected rotational speed. The resulting motor torque signal may be sinusoidal.

If a sufficiently large enough load imbalance is present, the washing machine may experience undesirable vibrations and movements when the drum 16 is rotated at high speeds during a spin phase. To address the imbalance, additional elements or systems, such as the balance rings 32, are incorporated into the washing machine to absorb, dampen, or offset the vibrations and movements.

The movement of the balancing material 33 within the balancing ring 32 is a function of the amount of the load imbalance 114 and the rotation speed, $\omega$, of the drum 16. The balancing material 33 in the balancing rings 32 moves relative to the load imbalance 114 such that the load imbalance 114 may be counterbalanced by the balancing material 33. However, the balancing material 33 may move independent of the load imbalance 114 and/or respond more slowly than the rotational speed of the drum such that the net imbalance of the system changes over time. In one example, a balancing ring 32 having metal balls for the balancing material 33 may rotate three percent slower than the drum 16.

Figure 5:
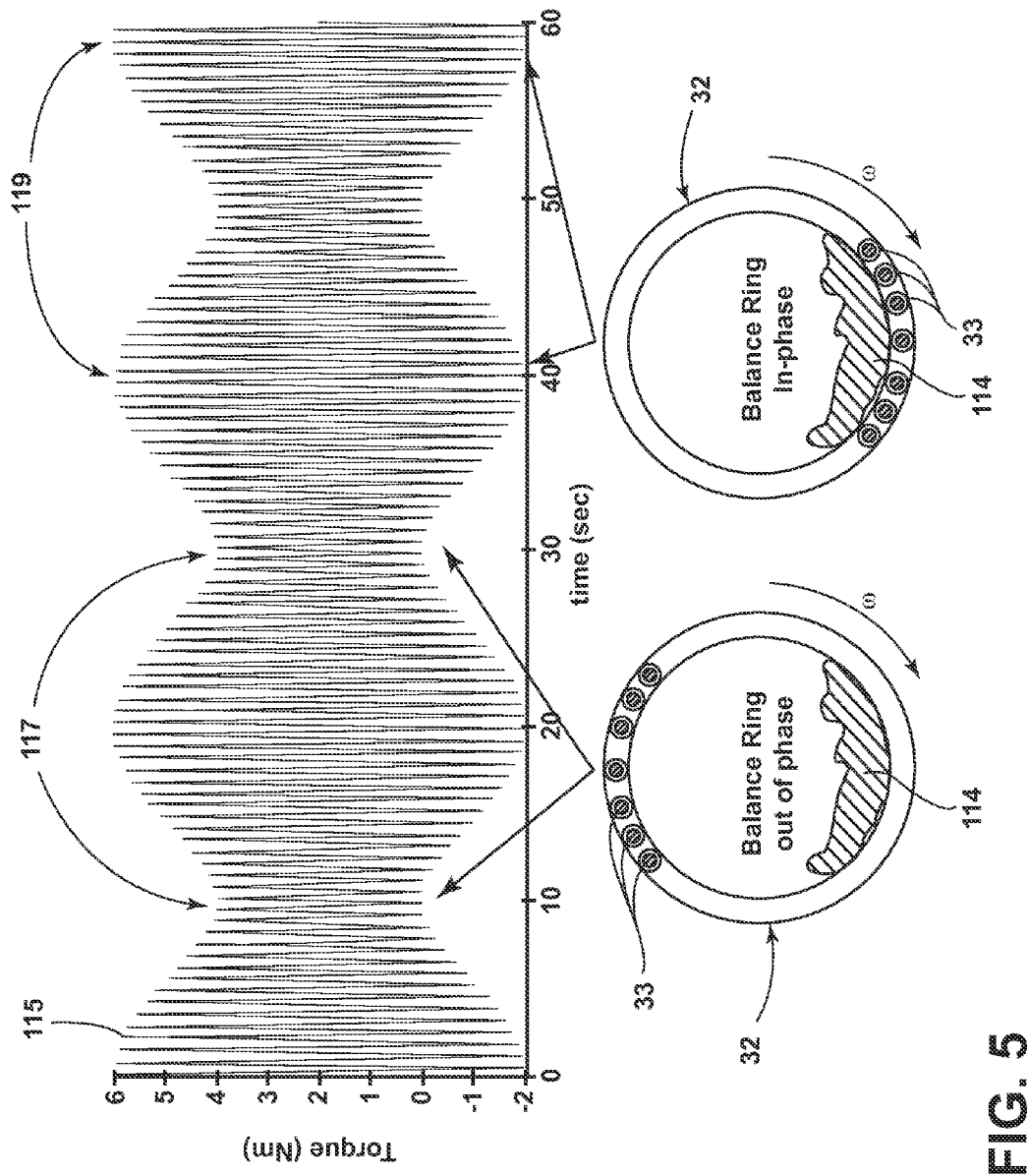
FIG. 5 illustrates the relationship between drum rotation with an imbalance and a motor torque signal.

FIG. 5 illustrates a graph showing the net imbalance of the system, as measured by a motor torque signal 115, as a function of time. The net imbalance of the system is the combination of the load imbalance 114 and the imbalance generated by the balancing material 33. If the load imbalance 114 and the balancing material 33 are out of phase, the net imbalance is the difference between the amount of the load imbalance and the amount of the balancing material 33, illustrated as local minima 117 on the motor torque signal 115. If the load imbalance and the balancing material 33 are in phase, the net imbalance is the sum of the amount of the load imbalance and the amount of the balancing material 33, illustrated as local maxima 119 on the motor torque signal 115. A larger imbalance amount requires more power from the motor 88 to rotate the drum 16 at the speed set by the controller 96, resulting in a variation in the amount of power and or torque required to rotate the drum 16.

The controller 96 may be configured to control the operation of the washing machine 10 by utilizing and/or analyzing the motor characteristic signal to determine if a predetermined condition, such as a laundry unbalance condition, exists or is occurring. Typically, this is accomplished by applying one or more filters to the motor torque signal 115 to identify a signal of interest, such as the signal at the drum 16 frequency. However, as explained above, due to the variations of, for example, the balancing material 33, a load imbalance 114, and any tumbling of the laundry items 116, the sensed and/or measured characteristics of the motor 88 and/or the drum 16 may be imperfect. Additionally, it should be noted that in a practical implementation, even if the controller 96 is driving the motor/drum at a constant speed set point, most controllers do not maintain a perfect speed. The controller 96 may provide for some variability, which may often be up to 10% for commonly used controllers. For example, if the drum 16 has a desired rotation speed of 100 rotations per minute (RPM), the actual rotational speed of the drum 16 may vary and/or oscillate between 90 and 110 RPM. The imperfections of the characteristic signals, and controller 96 variability may produces less effective filtered characteristic signal when trying to identify the signal of interest.

Under such conditions, the "noise" in the signal related to the imbalance lies within the range of variation of the speed for the given controller. Under these conditions, a traditional time-based filter method will not be able to filter the noise from the signal and result in an erroneous imbalance determination or a failure to determine the imbalance all together.

Figures 6A, 6B:
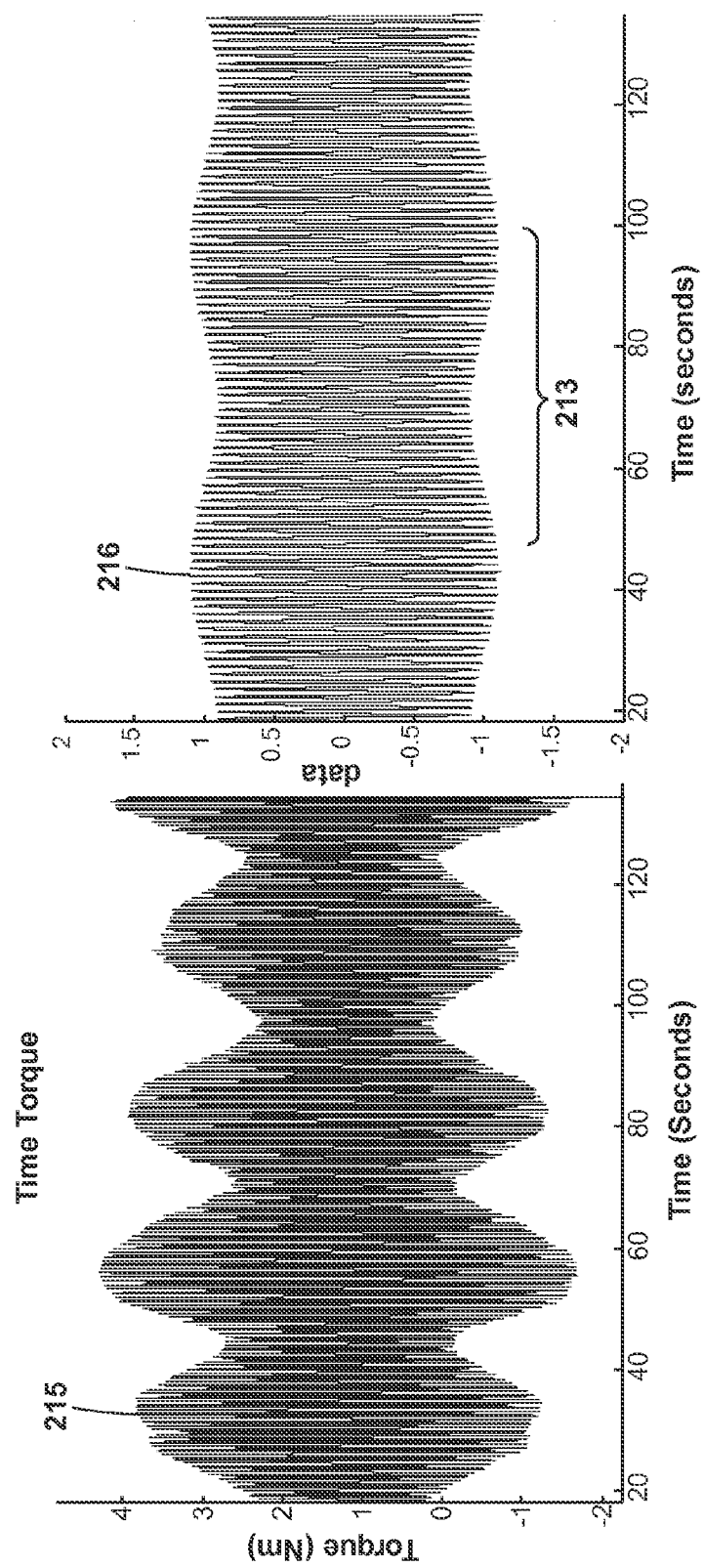
FIGS. 6A & 6B illustrate the relationship between motor torque signal as a function of time, and a resultant filtering of the motor torque signal as a function of time.

FIG. 6A illustrates such a condition in the context an exemplary imperfect motor torque signal 215 as a function of time. FIG. 6B illustrates a filtered motor torque signal 216, generated by utilizing a predefined finite filter to filter out a noise signal of the motor torque signal, such as the balancing ring 32 signal. As shown, a repeating oscillation, or 'beating' 213 of the filtered motor torque signal 216 remains due to the imperfect nature of the original signal 215, as a function of time. This beating 213 is due mainly to the limitations of the predefined finite filter or filters used to define the pass band and stop band of the filter. Resultantly, the balancing material signal may sometimes be passed while varying in the pass band, while it may be filtered out while varying in the stop band.

This beating 213 of the traditional time-based, filtered signal is undesirable and renders the traditional filter method ineffective in the described conditions as the noise desired to be eliminated is close enough to the desired signal that the noise is passed through the filter. It has been found that the application of an appropriate spatial sampling of the data generates a signal inherently eliminates the noise and/or a signal where the noise is easily filtered.

By spatial sampling, it is meant that the motor characteristic sensors 104 and/or the controller receiving input from the sensors 104, may be configured to provide data based on spatial position, as compared to temporal or time-based sampling of the motor characteristic signals. In this sense, "spatial sampling" is used to mean that values for the motor characteristic signal are sampled on a spatial dimension, not a time dimension. For purposes of the rotating motor 88 and/or drum 16, the "unit" of spatial sampling is, for convenience, sampled on a per revolution of the motor 88 and/or drum 16, be it whole revolutions or fractions of a revolution. For example, the motor torque sensor may be capable of spatially sampling the motor torque characteristics for each 30 degrees of rotation. The example of spatially sampling the torque characteristic for each 30 degrees of rotation is merely one non-limiting example of sampling criteria, and any number of samples over any number of predetermined rotational positions, fixed rotational positions, and/or rotational segments of the drum 16 may be included.

A comparison of spatially sampled data to time sampled data may be helpful for a fuller understanding. A plot of the spatially sampled data would have a y-axis of motor characteristic and an x-axis of revolution(s), instead of the traditional time x-axis when time is the period by which the data is sampled. The spatially sampled data is inherently independent of time, unless the speed of the drum is perfectly constant. For example a motor/drum rotating having different rotational speeds over the sampling period will result in data points that are not spaced equally in time. In a simplified example, if over the sampling period, the speed was 50 rpm for the first half of the sampling period and 100 rpm for the second half of the sampling period, the time between data points for the 100 rpm speed is half of the time between data points for 50 rpm.

While spatial sampling may be used in place of time sampling for about any reason, it has been found that spatial sampling is particularly useful when the signal being sampled has time-based "noise" that would interfere with the data of interest when sampled in time.

FIG. 7A illustrates a motor torque signal 315, similar to the motor torque signal 215 of FIG. 6A, except that the signal 315 was generated via spatial sampling, as a function of cumulative rotational position, which is measured in terms of radians. FIG. 7B illustrates a filtered motor torque signal 316, generated by utilizing a filter to filter out a noise signal of the motor torque signal, such as the balancing ring 32 and/or balancing material 33 signal. As shown, no 'beating' of the filtered motor torque signal 316 occurs due to the elimination of the portion of the signal 315 generated from the variation of speed of the drum 16 between 87 and 90 RPMs. Stated another way, since the torque signal is being measured spatially per revolution, the same number of samples of the motor torque are taken regardless of the speed of rotation. In this sense, the filtering filters a noise signal the variable range, or "range of variability," of the motor torque signal 315. This filtered motor torque signal 316 taken from the spatially sampled signal 315 thus contains more consistent and/or more precise data, and thus, provides improved evaluation of the data to determine if the predetermined condition, such as a load imbalance 114, is present. Additionally, the evaluation of the data may determine not only if the predetermined condition is present, but may also include determination of a value indicative of the magnitude of the condition, such as the magnitude of the imbalance 114. In this sense, the presence of the predetermined condition may be determined when the magnitude of the predetermined condition satisfies a predetermined threshold value.

Figure 8:
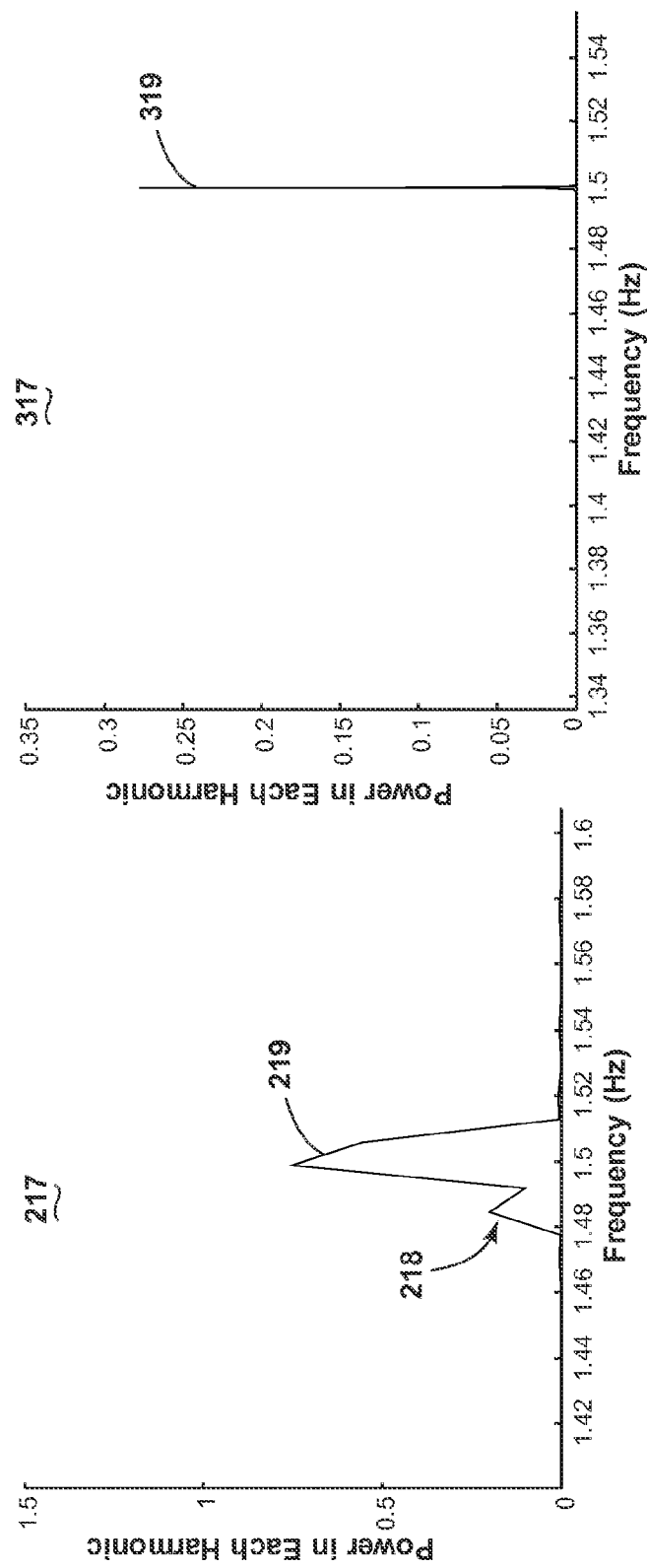
FIG. 8 is an illustration of a fast Fourier transformation of both a motor torque signal as a function of time and a motor torque signal as a function of spatial sampling.

FIG. 8 illustrates a further comparison of a fast Fourier transformation (FFT) filtering of the aforementioned motor torque signals 215, 315, as viewed in the frequency domain. As seen in the first graph 217, the FFT filtering of the motor torque signal 215 (as a function of time) of FIG. 6A introduces a balancing material component 218 (noise) in the filtered signal 219. Conversely, as seen in the second graph, the FFT filtering of the motor torque signal 315 (as a function of spatial sampling) of FIG. 7A produces a very "clean" filtered signal 319, eliminating the undesired balancing material signal.

While the example of filtering the balancing material 33 signal from the motor torque signal 315 has been described, additional and/or alternative noise signals within the range of variability, such as noises due to motor pole pairs times the drum speed, harmonics of the electrical frequency (first-order and higher) related to the motor and/or electrical drive, harmonics of the basket frequency (first, second, third, etc.), electrical sensor signal acquisition noise, and/or any other undesirable noises that have a speed dependence, may be filtered from any motor characteristic signal, such as the motor torque signal 315 or a rotational speed signal about a set rotational speed.

Furthermore, because the spatial sampling is not dependent on the speed of the rotating drum 16, embodiments of the invention may include filtering a noise signal from a motor characteristic signal while the drum 16 varies rotational speed, for example, when accelerating through a satellization speed. In this sense, the method may apply a first predetermined filter to the motor characteristic signal for a first signal range, and then apply a second predetermined filter to the motor characteristic signal for a second signal range, etc., or the method may apply a single filter regardless of the motor characteristic signal range or speed of the drum 16. The filtering of the motor characteristic signal, and the evaluation of the filtered motor characteristic signal may be used to determine, for instance, when the tumbling of the entire load of laundry items 116 ceases, and thus, when the presence of a predetermined condition, such as satellization speed, is reached and/or takes place. Alternatively, as described, the method may evaluate the filtered motor characteristic signal for the presence of at least one portion of the laundry load or items 116 reaching a satellizing speed.

Many other possible embodiments and configurations in addition to that shown in the above figures are contemplated by the present disclosure. For example, one embodiment of the invention contemplates an apparatus and method applied to a vertical axis washing machine. Additionally, the design and placement of the various components may be rearranged such that a number of different in-line configurations could be realized.

The embodiments disclosed herein provide an apparatus and method for removing noise from a motor characteristic signal in a laundry treating appliance. One advantage that may be realized in the above embodiments is that the above described embodiments have superior accuracy and filtering advantages over the conventional type speed and/or time-based filtering systems. With the above-described embodiments of the invention, the washing machine and/or method of removing noise from the motor characteristic signal operates independent of speed, so one or more filters can be used for all speed ranges. This is because there are always "N" samples per revolution. Furthermore, the speed tracking of the washing machine does not need to be perfectly accurate to implement the method because the motor characteristic signal data is sampled based on the drum position, regardless of speed oscillation around a set point. The result is that, for example, a single filter can be used to precisely pass desired signals that occur at some period of drum rotation (e.g. an unbalance signal with a period of 1 cycle per 360 degrees), and attenuate other signals (e.g. balance rings with a period of 0.97 cycles per 360 degrees). This enables the desired signal to be tracked very accurately, with rejection of other signal components both nearby and far away.

In the example of satellization speed, the technique described herein may be capable of replacing a plurality of filters used in series to detect the satellization of clothing in the washing machine, wherein each of the plurality of filters has an applicable drum speed range.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A laundry treating appliance for treating laundry according to an automatic cycle of operation, comprising:
 a rotatable drum at least partially defining a treating chamber for receiving laundry for treatment according to the automatic cycle of operation;
 a motor operably coupled to and rotationally driving the rotatable drum;
 a sensor providing output corresponding to a motor characteristic at predetermined rotational positions for the motor to form a spatial output;
 a balancing ring coupled to the drum and including a balancing material moveable within the balancing ring; and
 a controller operably coupled to the motor and the sensor and programmed to execute the cycle of operation based on a filtered motor characteristic signal, receive the spatial output to generate a motor characteristic signal based on the spatial output representative of an unbalance condition of the laundry within the drum, apply a filter to the motor characteristic signal to remove a noise signal generated by the balancing ring representative of the movement of the balancing material to form the filtered motor characteristic signal, and evaluate the filtered motor characteristic signal for the presence of a predetermined condition corresponding to the unbalance condition of the laundry within the drum.

2. The laundry treating appliance of claim 1 wherein the predetermined condition is an unbalance threshold.

3. The laundry treating appliance of claim 1 wherein the balancing material includes one or more balancing balls.

4. The laundry treating appliance of claim 1 wherein the spatial output is based on one of a torque of the motor, a rotational speed of the motor, or a power to the motor.

5. The laundry treating appliance of claim 1 wherein the noise signal is representative of the position of the balancing material within the balancing ring corresponding to the unbalance condition.

6. The laundry treating appliance of claim 1 wherein the filter applied to the motor characteristic signal is a fast Fourier transformation.

* * * * *